(12) United States Patent
Fong

(10) Patent No.: US 6,368,682 B1
(45) Date of Patent: Apr. 9, 2002

(54) COMPOSITION AND STRUCTURES MADE THEREFROM

(75) Inventor: Bettie C. Fong, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/425,270

(22) Filed: Oct. 22, 1999

(51) Int. Cl.[7] .......................... C09K 19/00; G02B 7/00; B32B 27/36; B32B 27/40; C08F 290/06; C08F 2/46

(52) U.S. Cl. .................... 428/1.5; 428/66.6; 428/425.8; 428/461; 428/480; 359/503; 522/182

(58) Field of Search .................... 252/299.01; 428/65.6, 428/66.6, 425.8, 461, 1.1, 1.5; 522/480; 359/503; 525/286

(56) References Cited

U.S. PATENT DOCUMENTS

| | | | |
|---|---|---|---|
| 3,373,075 A | | 3/1968 | Fekete et al. |
| 4,477,328 A | | 10/1984 | Broeksema et al. |
| 4,508,785 A | | 4/1985 | Cobbledick et al. |
| 4,879,318 A | | 11/1989 | Lipscomb et al. |
| 5,175,030 A | | 12/1992 | Lu et al. |
| 5,183,597 A | | 2/1993 | Lu |
| 5,479,555 A | | 12/1995 | Rot et al. |
| 5,518,789 A | * | 5/1996 | Burns et al. ................ 428/65.5 |
| 5,626,800 A | | 5/1997 | Williams et al. |
| 5,635,278 A | | 6/1997 | Williams |
| 5,691,846 A | | 11/1997 | Benson, Jr. et al. |
| 5,716,681 A | | 2/1998 | Williams |
| 5,726,219 A | | 3/1998 | Hosomi et al. |
| 5,855,983 A | | 1/1999 | Williams |
| 5,883,607 A | | 3/1999 | Williams |
| 5,900,287 A | | 5/1999 | Williams |
| 5,908,874 A | | 6/1999 | Fong et al. |
| 5,910,858 A | * | 6/1999 | Frey et al. ................... 359/534 |
| 5,932,626 A | | 8/1999 | Fong et al. |
| 6,107,364 A | * | 8/2000 | Fong et al. ................... 522/182 |

FOREIGN PATENT DOCUMENTS

| | | |
|---|---|---|
| DE | 40 10 783 A1 | 10/1991 |
| JP | 5287040 | 11/1993 |

* cited by examiner

*Primary Examiner*—Shean C. Wu
(74) *Attorney, Agent, or Firm*—Merchant & Gould P.C.

(57) ABSTRACT

A non-halogenated composition having a high index of refraction, preferably greater than 1.55, comprising a vinyl monomer, such as methyl styrene. The cured composition is particularly suited for having a metal layer, such as silver, applied thereto. In one embodiment, the composition can be used to form a microreplicated prismatic structure. Preferably, the structure has two sides, where one side is substantially smooth and the other includes saw-tooth formations having tilted surfaces. A metal layer may be present on one or more sides of the prismatic substrate having the saw-tooth formations.

41 Claims, 2 Drawing Sheets

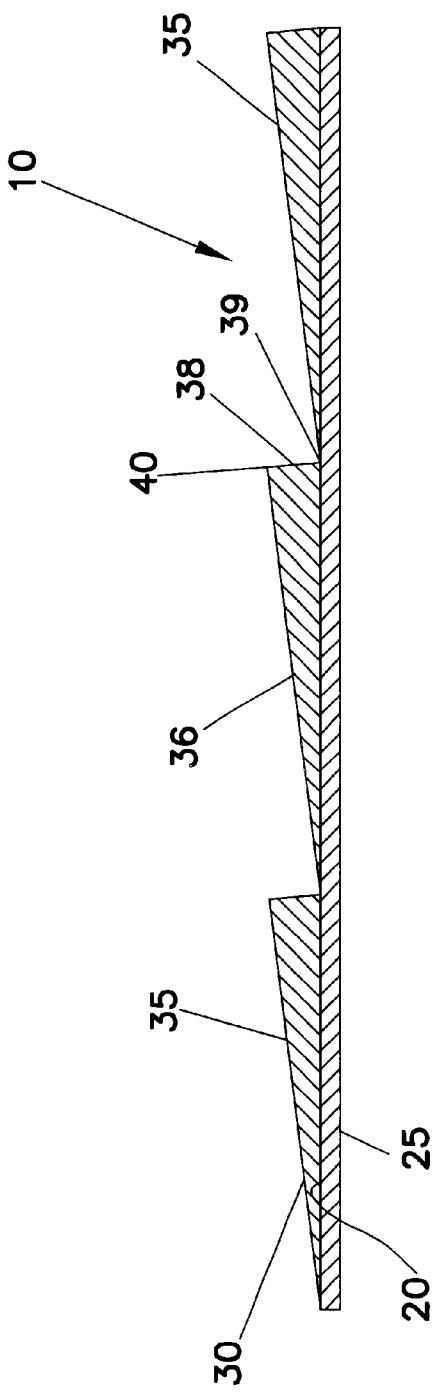
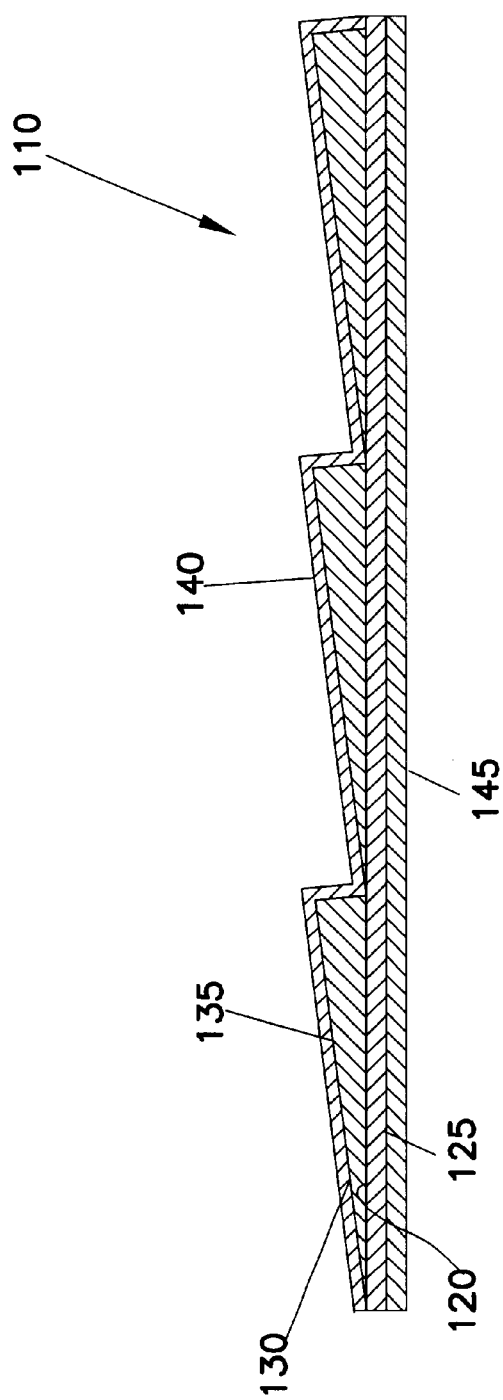

COMPOSITION AND STRUCTURES MADE THEREFROM

FIELD OF THE INVENTION

The present invention is directed to a composition for use in a light directing arrangement and method for use with a display apparatus, and more particularly to a composition that is resistant to corrosion.

BACKGROUND OF THE INVENTION

Liquid crystal displays (LCD) are used in many different types of electronic devices, including portable computers, cellular phones, and digital watches. An LCD may include a reflector for directing ambient light to the viewer, or a partially transmissive reflector for also allowing light from a light source within the device to convey information to the viewer. A partially transmissive reflector is commonly called a transflector, and an LCD that incorporates a transflector is commonly called transflective. Some examples of LCD devices are discussed in co-pending application, "Optical Devices Using Reflecting Polarizing Materials", Ser. No. 09/298,003, filed Apr. 22, 1999.

SUMMARY OF THE INVENTION

The present invention is to a composition, and a prismatic structure in a display apparatus that utilizes this composition. The composition, when cured to form a structure is generally void of halogenated components yet provides a high index of refraction. Further, the structure provides a good substrate for adhesion of a metal layer thereon. And further, the composition provides protection against corrosion for a metallic layer that may be provided in the display apparatus, particularly a layer having silver therein, either on the prismatic construction or elsewhere in the display apparatus.

The composition of the present invention includes a vinyl monomer, for example, an alkyl styrene monomer such as methyl styrene, and various co-monomers and/or oligomers. In particular, a composition comprises each of bisphenol-A epoxy diacrylate, novolak epoxy acrylate, and a vinyl monomer, which includes alkyl styrenes (for example, methyl styrene). An initiator may be added to provide a free radical source to initiate polymerization of the composition to a polymerized structure.

The composition of the present invention, when provided as a film, may be coated with a metallic layer. The metal layer may be selected from a group consisting of silver, chromium, nickel, aluminum, titanium, aluminum-titanium alloy, gold, zirconium, platinum, palladium, aluminum-chromium alloy and rhodium. The metal layer is preferably silver. In a preferred embodiment, the metal layer is a silver layer having a thickness of about 400 Angstroms.

The composition may be provided as a three dimensional prismatic structure. Typically, the structure has two sides, where one side is substantially smooth and the other has a three dimensional structure, such as saw-tooth formations having tilted surfaces. A tilt angle of the tilted surfaces offsets an optimal viewing angle for the display from a glare angle for the display. In one application, the tilted surfaces of the prismatic layer may have a tilt angle of about 1° to 35° from horizontal. The saw-tooth formations may have a pitch (i.e., the prism repeat distance) of about 5 microns or more and about 200 microns or less, for one specific application.

A metal layer may be provided on either side of the prismatic structure, although in some embodiments it is preferred that the metal layer is on the side having the three dimensional prismatic formations.

A film of the composition, whether a flat film or a three-dimensional film, may also include a pressure sensitive adhesive layer. The pressure sensitive adhesive layer may be an acrylate acrylic acid adhesive layer, the adhesive layer being preferably optically diffuse.

BRIEF DESCRIPTION OF THE DRAWINGS

The invention may be more completely understood by considering the detailed description of various embodiments of the invention which follows in connection with the accompanying drawings.

FIG. 1 is a cross-sectional view of a three dimensional prismatic structure incorporating the composition of the present invention;

FIG. 2 is a cross-sectional view of a three dimensional prismatic structure incorporating the composition of the present invention and having a metal coating thereon.

Figure 3:
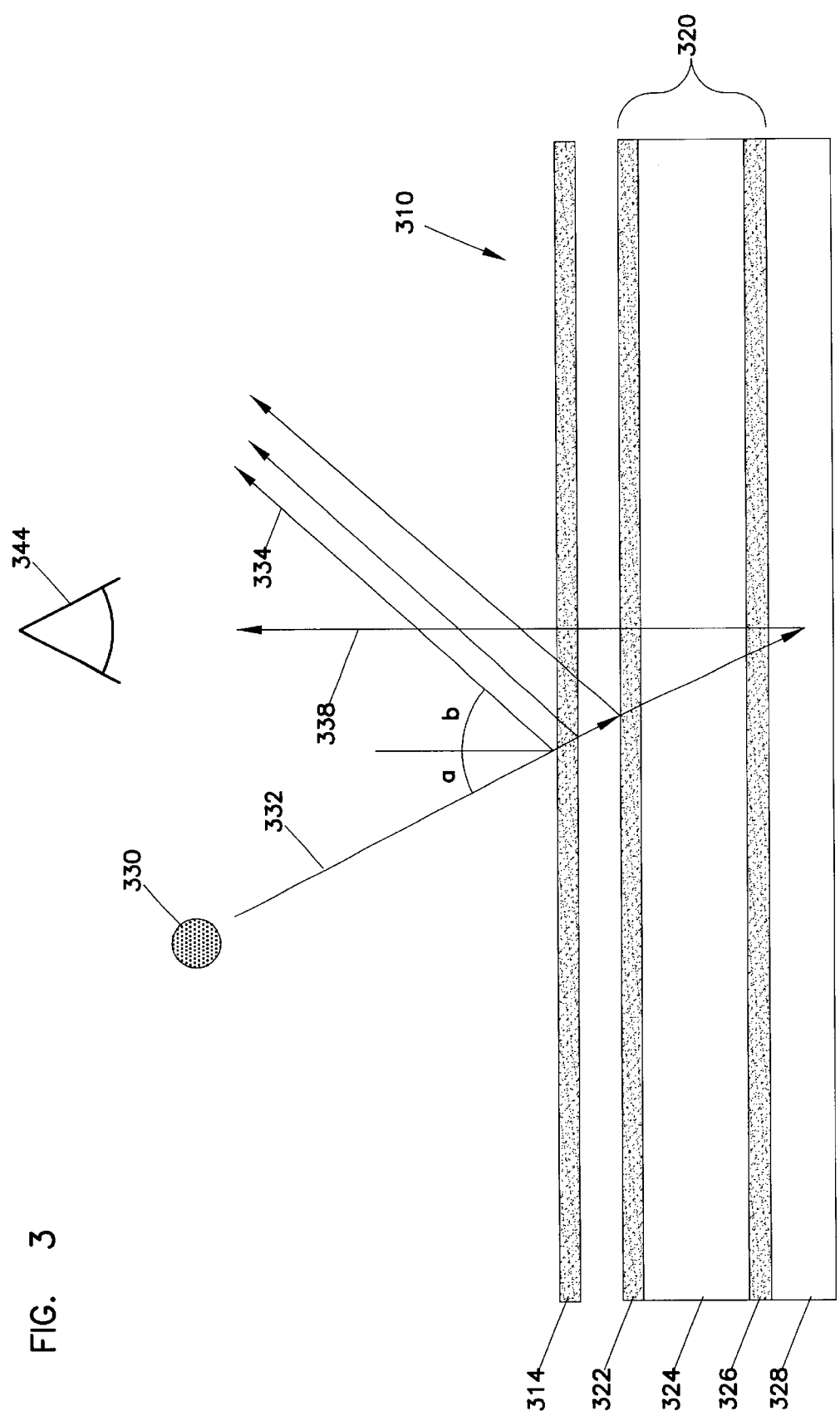
FIG. 3 is a cross-sectional view of a display apparatus including a light directing film of one embodiment of the present invention.

While the invention is amenable to various modifications and alternative forms, specifics thereof have been shown by way of example in the drawings and will be described in detail. It should be understood, however, that the intention is not to limit the invention to particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention is believed to be applicable to a variety of systems and arrangements for optical configuration. One such area of systems and arrangements are those which direct light away from a glare angle and reduce corrosion of and other damage to a reflective or transflective metal layer in a display. The invention has been found to be particularly advantageous in optical applications where a high index of refraction material is desired, in constructions that include a metal coating (such as silver), and in molded three-dimensional constructions. While the present invention is not so limited, an appreciation of the various aspects of the invention is best gained through a discussion of the various application examples operating in such an environment.

The present invention is a generally non-halogenated polymerizable composition, and a cured structure of the composition, that has a high index of refraction, typically 1.50 or greater, preferably 1.55 or greater, and most preferably 1.57 or greater.

The present invention relates to a polymerizable composition. As used within, the term "polymerizable" refers to a chemical molecule such as a monomer or oligomer, etc., or to a chemical composition, the molecule or composition being capable of curing, i.e., polymerizing or copolymerizing, for example, via unsaturated moieties, to produce a higher molecular weight material. The polymerized, or cured composition is generally referred to as a "structure".

The polymerized structure of the present invention is especially conducive to having metal layer or film coated or otherwise applied to the structure. The polymerizable composition that results in the cured structure is generally non-halogenated; halogen agents may cause corrosion of the metal layer, thus, it is desired that the composition include no halogenated materials. In some compositions, a minuscule amount of a halogenated material may be present in the composition, for example, as a component of a surfactant or other additive that is present in a low amount, such as less than about 1%. The amount of any material that includes a halogenated portion should not be prevalent to a level that would degrade the adhesion of the metal layer to the structure of the present composition or that would corrode the metal layer. In fact, the actual level of the halogen atom, itself, in the composition should be less than about 0.2 weight percent of the total composition, preferably less than about 0.15 weight percent, and most preferably less than about 0.1 weight percent. In some embodiments, such as when the halogen is bromine, the level in the total composition should be less than about 0.1 weight percent, preferably less than 0.01 weight percent, and most preferably not even present (i.e., zero weight percent).

The cured structure of the polymerized composition is conducive to having a metal layer applied to a surface. When used for an optical application, the metal layer is preferably highly reflective, and partially transmissive. The transmissivity of the metallic layer makes it possible to use a light cavity or a back-lit screen in a display apparatus in which the composition may be present.

The polymerizable composition of the present invention comprises each of bisphenol-A epoxy diacrylate, an epoxy acrylate having a functionality of two or greater, and a vinyl monomer, which includes alkyl styrenes (for example, methyl styrene). An initiator may be added to provide a free radical source to initiate polymerization of the composition to a polymerized structure. It is understood that the term "acrylates", when used in any context, also includes "methacrylates".

Vinyl Monomer

The vinyl monomer is the component that helps provide the necessary properties to the structure resulting from the polymerization of the composition of the present invention. Good metal adhesion, high index of refraction, smooth cured structure, and/or other properties may be attributed to this vinyl monomer component.

Examples of useable vinyl monomers include styrene, divinyl benzene, vinyl naphthalene, α-methylstyrene, diallyl isophthalate, and C1 to C8 alkyl styrenes.

An alkyl styrene may have one to eight carbon in the alkyl group in one example. One specific example is tertiary butylstyrene. Another specific example, and a preferred alkyl styrene for some embodiments, is methyl styrene. Methyl styrene exists and is useful in the polymerizable compositions of the present invention as any of various isomeric forms, including the ortho-, meta-, and para- isomers. Methyl styrene is commercially available in ratios of 80:20, 70:30, 60:40, 55:45, and 5:95 (meta:para). A 70:30 ratio is commercially available from Monomer-Polymer & Dajac Laboratory in Feasterville, Pa. Alternatively, methyl styrene can be prepared by methods known in the chemical art; see the Encyclopedia of Polymer Science and Engineering, volume 16, page 13 (2nd ed. 1985).

In the composition of the present invention, the vinyl monomer may act as a reactive diluent; that is, it helps to solubilize the other monomers/oligomers by reducing the viscosity, yet cross-links into the structure. Methyl styrene is a preferred monomer for reducing the viscosity of the total composition.

The vinyl monomer is present in the polymerizable composition at a level of at least about 2 percent by weight, no greater than about 30 percent by weight, and typically about 5 to 25 percent by weight of the total composition. Preferably, it is present at about 15 to 20 percent by weight.

Bisphenol-A Epoxy Diacrylate

The composition further includes bisphenol-A epoxy diacrylate, a diacrylate ester of epoxy resin, in particular, it is the diacrylate ester of bisphenol A epoxy resin. An alternative name is bisphenol A diglycidyl ether diacrylate. In some embodiments, bisphenol-A diacrylate or bisphenol-A ethoxylate diacrylate may be used in place of the bisphenol-A epoxy diacrylate. Methacrylates may also be used.

An example of a commercially available bisphenol-A epoxy diacrylate resin is "CN-104" from Sartomer Company. Other examples include "Ebecryl 600" and "Ebecryl 3720" by UCB chemicals.

The bisphenol-A epoxy diacrylate is present in the polymerizable composition at a level of at least about 40 percent by weight, no greater than about 90 percent by weight, and typically about 55 to 80 percent by weight of the total composition. Preferably, it is present at about 65 to 80 percent by weight.

Acrylated Epoxy

An acrylated epoxy is included in the composition of the present invention to provide cross-linking of the vinyl monomer and bisphenol A-epoxy acrylates. Preferably, the acrylated epoxy has a di- or tri- functionality, although higher functionality polymers may be used. Single functionality acrylated epoxies may result in a cured structure that is too soft for an intended purpose.

Acrylated epoxies are the acrylated esters of an epoxy, including diacrylated esters and triacrylated esters. Often, acrylated epoxies are epoxy resins made by the reaction of epichlorohydrin (chloromethyl oxirane) with a novolak resin (phenolformaldehyde). The reaction may include methacrylic acid or acrylic acid. Acrylated epoxies have a repeating epoxide structure that offers better resistance to high temperatures than the epichlorohydrin -bisphenol A type.

An example of an acrylated epoxy is "CN1 12C60" from Sartomer. Another example of an acrylated epoxy, in particular, a novolac epoxy triacrylate diluted 20% with tripropylene glycol diacrylate, is "Ebercryl 3603" from UCB Chemicals Corp.

The acrylated epoxy is present in the polymerizable composition at a level of at least about 0.5 percent by weight, no greater than about 20 percent by weight, and typically about 1 to 15 percent by weight of the total composition. Preferably, it is present at about 2 to 10 percent by weight.

Photoinitiators

The composition of the invention is polymerizable. Polymerization can be accomplished by usual means, such as heating in the presence of a free-radical initiator, irradiation with radiation, and by electron beam. Examples of usable types of radiation include ultraviolet light, visible light, radio waves, microwaves, and infrared. The preferred method of polymerization is by irradiation with ultraviolet light in the presence of a photoinitator.

Polymerization initiators, commonly referred to as photoinitiators, may be used to initiate the polymerization.

Examples of initiators include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof.

Examples of suitable commercially available, ultraviolet-activated photoinitiators include "Irgacure 651" and "Irgacure 184" commercially available from the Ciba Company, and "Darocur 1173" commercially available from Ciba Chemicals. A visible light-activated photoinitiator is commercially available from Ciba Chemicals under the trade name "Irgacure 369". The use of phosphate containing photoinitiators, in particular acylphosphine oxide containing photoinitiators, may be desired in some compositions. An example of such a photoinitiator is 2,4,6-trimethylbenzoyldiphenylphosphine oxide which is commercially available from BASF Corporation, under the trade designation "Lucirin TPO". Other examples of commercially available acylphosphine oxides include "Darocur 4265" commercially available from Ciba. More than one photoinitiator may be used in the composition; a combination may provide advantages over a single initiator. In some compositions, a combination of "Irgacure 184" and "Lucirin TPO" is preferred.

The photoinitiator is present at a level of at least about 0.1 weight percent in the total polymerizable composition, and no greater than about 10 weight percent; typically, the photoinitiator is present at a level of at least about 0.25 weight percent. In a preferred embodiment, the photoinitiator is present at a level of about 1 to 5 weight percent, more preferably about 1.5 to 4.5 weight percent.

Additives

The polymerizable composition can further comprise any variety of additives to modify the composition to provide desirable properties to the polymerizable composition and to the cured composition. Additives that can be used include coupling agents, fillers, expanding agents, anti-static agents, initiators, suspending agents, lubricants, wetting agents, surfactants, dispersants, pigments, dyes, UV stabilizers, complexing agents, chain transfer agents, accelerators, catalysts, and activators. The amounts of these materials are selected to provide the properties desired, but are generally present at a level of at least about 0.1 weight percent in the total polymerizable composition, and no greater than about 10 weight percent. Typically, any additives are present at a level of less than about 5 weight percent, more typically less than about 2 weight percent.

In some embodiments it may be desired to add a surfactant or a wetting agent to the composition in order to improve the processability of the polymerizable composition; this would include improved mixing properties, improved wetting properties, and the like. A surfactant or wetting agent, or the combination, is generally present at a level of at least about 0.1 weight percent in the total polymerizable composition, and no greater than about 10 weight percent. Typically, they are present at a level of less than about 2 weight percent, more typically less than about 1 weight percent.

A fluorochemical surfactant/wetting agent, such as "FC-430" commercially available from 3M company, can be used to provide improved wetting of the composition onto a PET (polyethylene terephthalate) substrate. A preferred level of this fluorochemical is about 0.1 to 0.5 weight percent, more preferably about 0.2 to 0.3 weight percent of the total polymerizable composition. As mentioned above, any halogen materials, such as fluorochemicals, should be present at minimal levels to maintain the good adhesion of metal layers to the cured composition. Preferably, the level of the halogen atom, itself, in the composition should be less than about 0.2 weight percent of the total composition, preferably less than about 0.15 weight percent, and most preferably less than about 0.1 weight percent. For example, the fluorine atoms in "FC-430" occupy approximately 50 weight percent of the total molecule. Thus, a level of 0.3 weight percent of "FC-430" would provide a fluorine weight percent of about 0.15 percent.

The above materials, together with an additional additives, are thoroughly combined to provide the coatable, polymerizable composition. This composition is then formed into a desired structure. Typically, the composition is coated onto a flexible backing. Examples of backings include polymeric film, primed polymeric film, metal foil, cloth, paper, nonwovens and treated versions thereof and combinations thereof. One preferred type of backing is a polymeric film. Examples of such films include polyester films, polyester and co-polyester films, microvoided polyester films, polyimide films, polyamide films, polyvinyl alcohol films, polypropylene film, polyethylene film, and the like. The thickness of the polymeric film backing generally ranges between about 20 to 1000 micrometers, preferably between 50 to 500 micrometers and more preferably between 60 to 200 micrometers.

The composition of the present invention provides good adhesion between itself and the polymeric film backing, in particular, PET, polycarbonate and PMMA (polymethylmethacrylate) films. By utilizing the composition of the present invention, priming or other surface treating of most polymeric substrates is not needed; however, the coating surface of polymeric film backing may be primed to improve adhesion still further. The primer can involve surface alteration or application of a chemical-type primer. Examples of surface alterations include corona treatment, UV treatment, electron beam treatment, flame treatment and scuffing to increase the surface area. Examples of chemical-type primers include ethylene acrylic acid copolymers, colloidal dispersions, aziridine-type materials, and radiation grafted primers.

The polymeric film backing may be either a clear or matte film. A matte film can be created by using bulk diffuser, a structured surface formed by sand blasting, plating, embossing or laser abalating, for example, or by adding particles, such as inorganic fillers, polymeric beads, silicon, or the like, to a coating solution. The use of matte films provides more uniformly distributed light and a wider viewing angle, along with some loss of brightness.

The polymerizable composition of the present invention can be coated onto a substrate by any conventional coating means such as drop die coater, knife coater, curtain coater, vacuum die coater or a die coater. During coating, it may be desired to minimize the formation of air bubbles. This entrapped air may led to porosity (i.e., voids) in the cured structure and possibly decrease the optical properties and/or provide an irregular, non-smooth surface.

The polymerizable composition is processed to form a polymerized, or cured, structure. This polymerized structure or produce may be a flat, planar film, or may be a film having at least one three-dimensional surface. The three-dimensional surface may be irregularly shaped, or may be molded or microreplicated to create a plurality of precisely shaped prismatic structures. Preferably, one surface of the structure includes prismatic structures and the opposite surface is a smooth, planar surface.

A smooth, planar structure can be made by providing a layer of the polymerizable composition, by any coating methods, and curing the composition to form the cured structure. Typically, both surfaces of the film-like structure will have a substantially smooth and planar face.

In a preferred embodiment, the cured composition provides a structure having a substantially smooth and planar face, and an opposite face that has the three-dimensional features. An imprecisely and/or irregularly shaped surface can be provided by coating the composition by a gravure coater or other such coater that can impart a topographical pattern in the resulting structure. Precisely shaped, three-dimensional topographic features can be microreplicated by using a production tool.

A production tool is used to create the desired topography, and has a front surface which contains a plurality of cavities distending as indentations out of the front surface. These cavities are essentially the inverse shape of the prismatic structure and are responsible for generating the shape and placement of the prismatic structures. The cavities can have any geometric shape that is the inverse shape to the geometric shapes suitable for the prismatic structures, such as cubic, saw-tooth, prismatic, rectangular, pyramidal, truncated pyramidal, and the like. The cavities may be grooves, thus providing an elongated structure. The dimensions of the cavities are selected to achieve the desired number of structures/square centimeter with the desired dimensions.

The production tool can be in the form of a belt, a sheet, a continuous sheet or web, a coating roll such as a rotogravure roll, a sleeve mounted on a coating roll, or die. The production tool can be composed of metal, (e.g., nickel), metal alloys, or plastic, and can be fabricated by any conventional technique, including photolithography, knurling, engraving, hobbing, electroforming, diamond turning, and the like. For example, a copper tool can be diamond turned and then a nickel metal tool can be electroplated off of the copper tool. In some instances, a photolithography process is desired because it creates patterns that cannot or are otherwise difficult and expensive to generate by other techniques such as diamond turning.

To provide a microreplicated structure using a production tool, the polymerizable composition is provided in the cavities of the production tool and is cured while in the tool. In a first method, the polymerizable composition may be coated into the cavities of the production tool and a substrate is applied over the composition. The composition is cured, preferably by radiation, and the resulting structure is removed from the cavities by pulling the substrate away from the tool. The cured three-dimensional structure is preferably adhered to the substrate. In a second method, the polymerizable composition may be coated onto a substrate. The production tool is brought into contact with the coated composition so that the compositions fills the cavities. The composition is then cured, the tool removed, and the resulting structures is preferably adhered to the substrate.

For additional information regarding microreplication of three-dimensional structures, see for example, U.S. Pat. No. 5,183,597 (Lu), which is incorporated herein by reference.

FIG. 1 illustrates a cross-sectional view of an example of a three-dimensional structure produced by microreplicating the polymerizable composition. Structure 10 has a first surface 20 and a second surface 30; first surface 20 is a generally planar, substantially smooth surface and the second surface 30 is a three-dimensional structure with a plurality of prismatic structures 35. First surface 20 is adhered to substrate 25.

The prismatic structures 35 of structure 10 form a saw-tooth pattern. Each prismatic structure 35 is precisely shaped with tilted surface 36 and a face 38 that extends from the base 39 of one tilted surface to the apex 40 of another titled surface. The pitch, that is, the repeat distance, of the apexes 40 of adjacent prismatic structures 35 is about 5 to 200 micrometers. The titled surface 36 is at an angle of about 6 to 9 degrees from parallel to first surface 20.

The structure of the polymerized composition of the present invention is especially conducive to having a metal layer or film coated or otherwise applied to the structure. The non-halogenated nature of the composition increases the adhesive nature between the cured composition and metals. FIG. 2 illustrates a cross-sectional view of a three-dimensional structure having a metal coating thereon, although it is understood that a metal coating may be put on a substantially flat, planar polymerized structure of the polymerizable composition of the present invention. Structure 110 has a first surface 120 and a second surface 130. First surface 120 is a generally planar, substantially smooth surface, and is adhered to substrate 125. The second surface 130 is a three-dimensional structure with a plurality of prismatic structures 135, which are similar to prismatic structures 35 of FIG. 1.

Over prismatic structure 135 is a thin metallic layer 140 that covers all faces of prismatic structures 135. The metal layer may be composed of many different materials capable of forming reflective layers, including silver, chromium, nickel, aluminum, titanium, aluminum-titanium alloy, gold, zirconium, platinum, palladium, aluminum-chromium alloy, rhodium, and combinations thereof.

The metal layer may be formed on either face of the prismatic substrate (i.e., the first surface 120 or the second surface 130) using many different methods that are known, such as vacuum deposition, vapor deposition, electrolytic and electroless plating. Vacuum deposition techniques include sputtering, evaporation and cathodic arc deposition. Plating techniques such as electroplating or solution plating could also be used. The metal layer has a thickness of at least about 25 angstroms and less than or equal to about 3000 angstroms. Typically, the metal layer thickness is about 50 to 1000 angstroms, preferably about 100 to 500 angstroms. Preferably, the metal layer has a relatively uniform thickness with a smooth surface.

Preferably, the metal layer is partially transmissive, allowing light from an internal light cavity to illuminate the display. The most preferred materials for a partially transmissive metallic layer are silver and aluminum, because of their reflective and transmissive qualities as thin layers. Silver is most preferred for its low light absorption, meaning that the sum of the reflectivity and the transmissivity of silver is high compared to other materials. In the preferred embodiment, the metal layer is a silver layer having a thickness of about 400 angstroms.

An adhesive layer 145 is provided on substrate 125 opposite prismatic structures 135 in FIG. 2. The adhesive may be any known adhesive material, but preferred materials include butyl acrylate/acrylic acid adhesive having a ratio between 90/10 and 97/3, iso-octyl acrylate acid having a ratio between 90/10 and 97/3, and iso-octyl acrylate/acrylic acid/isobornyl acrylate/Regalrez 6108 having a ratio of approximately 66.3/0.67/13.4/19.3. The adhesive may be used in combination with one or more cross-linkers, initiators, or other additives.

The structure produced from the polymerizable composition is particularly useful in liquid crystal displays (LCD)

that are used in many different types of electronic devices, such as portable computers, cellular phones, and digital watches. These display screens are typically either back-lit and/or lit by ambient light.

FIG. 3 illustrates a cross-section of one particular embodiment of a display 310 that can incorporate a structure of the present invention. A lens or touch screen 314 may receive input from the user of the display, or may contribute specific optical qualities to the display. The display further includes a light modulating layer 320, made up of a top structure 322, a liquid crystal layer 324, and a polarizer 326. Further, a light directing film 328 is attached to the polarizer 326. The light directing film 328 is provided to steer the image toward a desired viewing angle, which is substantially different than a glare angle of the display 310. The light directing film 328 may also be referred to as a beam steering film or tilted mirror film.

In FIG. 3, an ambient light source 330 is illustrated, producing incoming ambient light rays 332. In this illustration, a light ray 332 from source 330 is incident on the display apparatus at angle a from the normal. A portion of the incoming light will be reflected as glare, illustrated by glare ray 334, by the top surface of the display apparatus 310. The glare ray 334 has a glare angle, b, from the normal. The glare image will be visible over a range of viewing angles, but will have a peak brightness at glare angle b. Angle a is equal to angle b, according to the law of reflection. Another portion of the incoming light will pass through the light modulating layer 320 and be reflected by the light directing film 328, as display information or image, represented by image ray 338. The light directing film 328 is designed to direct the image ray 338 so that it will emerge from the display 310 at an angle from normal that is substantially different than the glare angle b. The display image will also be visible over a range of viewing angles, and will have a peak brightness at a narrower range of viewing angles, centered around an "optimal viewing angle." In FIG. 3, the peak image angle is nearly at the normal. As a result, a viewer of the display apparatus 310 at position 344 can view the display image clearly without interference from the glare image.

Additional information regarding using the composition of the present invention in light display can be found in Applicant's co-pending application titled "Display Apparatus with Corrosion-Resistant Light Directing Film," having U.S. Ser. No. 09/425,765 now U.S. Pat. No. 6,264,336, filed on the same date as the present application, the disclosure of which is incorporated herein by reference.

EXAMPLES

The following non-limiting examples will further illustrate the invention. All parts and percentages are based on a weight percentage. The following designations are used throughout the examples:

EAC Bisphenol-A epoxy diacrylate commercially available under the trade designation "CN-104" from Sartomer Company, Exton, Pa. 19341.

MS A mixture of 70% meta- and 30% para-isomers of methyl styrene (also referred to as vinyl toluene); commercially available from Monomer-Polymer & Dajac, Feasterville, Pa. 19053.

IBOA iso-bornyo acrylate;

AEP Novolac epoxy triacrylate diluted 20% with tripropylene glycol diacrylate; commercially availed under the trade designation "Ebecryl 3603 " from UCB Chemicals Corp.—Radcure Business Unit, Smyrna, Ga. 30080.

PH1 Diphenyl (2,4,6-trimethylbenzoyl) phosphine oxide, a photoinitiator, commercially available under the trade designation "Lucirin® TPO" from BASF, Charlotte, N.C. 28273.

PH2 1-hydroxycyclohexyl phenyl ketone, a photoinitiator, commercially available under the trade designation "Irgacure 184" from Ciba Chemicals, Tarrytown, N.Y. 10591

FC Nonionic fluorinated alkyl ester, commercially available under the trade designation "FC-430" from 3M Company, St. Paul, Minn. 55144.

The Examples and Comparative Example were prepared by the following method using the amounts of ingredients given in Table 1. The EAC was placed in an oven at 60° C. for several hours, depending on the amount of EAC. The heated EAC was removed from the oven and gently blended with the MS (Examples 1 and 2) or IBOA (Comparative Example). AEP, which had been warmed at 65° C. for 1–2 hours, was blended into the EAC and MS/IBOA mixture which had been maintained at 60° C. PH1, PH2, and FC were added, all the while keeping the mixture at 60° C. After the mixing was complete, the temperature was decreased to 55° C. and the mixture was gently stirred for 15–30 minutes to provide a coatable composition.

TABLE 1

| Example | EAC | MS | IBOA | AEP | PH1 (pph) | PH2 (pph) | FC (pph) |
|---------|-----|-----|------|-----|-----------|-----------|----------|
| 1       | 77  | 20  | 0    | 3   | 1.5       | 3.0       | 0.3      |
| 2       | 80  | 15  | 0    | 5   | 1.5       | 0.25      | 0.3      |
| Comp.   | 77  | 0   | 20   | 3   | 1.5       | 3.0       | 0.3      |

Pph = parts per hundred

The properties of the polymerizable composition were tested as described below and the results are reported in Table 2.

Measurement of Refractive Index

The refractive index of the uncured composition was measured by placing an amount of the polymerizable composition between a piece of PET and an un-primed PET; this was passed through a knife coater to provide an even coating. The film was passed under UV lamps (300 watt/cm) at a speed of 4.6 meters/minute (15 ft/min). The PET film was removed from the cured composition, which had a thickness of about approximately 20–30 $\mu$m. The cured composition was tested for its refractive index using a "Metricon Model 2010 Prism Coupler" available from Metricon Corporation of Pennington, N.J. 08534.

Measurement of Viscosity

The viscosity of the composition was measured by using a "Brookfield Model LV Viscometer" set at 30 RPM and with #3 spindle.

Measurement of VOC (volatile organic components)

The amount of volatile components of the polymerizable composition was measured according to ASTM D5403, "Standard Test Methods for Volatile Content of Radiation Curable Materials", except that the sample was heated at 177° C. (350° F.) for 1 minute, instead of 110° C. for 60 minutes.

TABLE 2

| Example | Refractive index, cured | Viscosity, Cps @ 21° C. | VOC |
|---|---|---|---|
| 1 | 1.5740 | 7000 | 1.3% |
| 2 | 1.5727 | 30000 | 1.3% |

Films were prepared by placing the composition between a PET film and a metal drum master tool having a microreplicated prismatic pattern. The prismatic pattern was as shown in FIG. 1, with a title angle of 6 degrees, and a prism pitch of 50 $\mu$m (micrometers). The composition was coated onto the PET film by a die to give a coating thickness of 5–7 $\mu$m on the PET. The master tool was warmed to 60° C. (140° F.) and then pressed onto the coated PET so that the composition filled the cavities in the tool. The PET/composition/tool construction was passed under 600 watt/cm UV lamps at a speed of about 9.1 meters/minute (30 ft/min), with the UV radiation passing through the PET into the composition. The master tool was separated from the PET, which had a prismatic structure replicated on it. The prismatic film was then passed under a post-cure UV lamp, and through an annealing oven to remove any residual monomers.

No pin holes or other surface defects were visually noticeable in the prismatic structures of Examples 1 and 2.

The properties of the microreplicated film were tested as described below and the results are reported in Table 3.

Measurement of $T_g$

The glass transition temperature (i.e., $T_g$) was measured by using a "Modulated DSC" manufactured by TA Instruments, Inc. of New Castle, Del.

Measurement of Pencil Hardness

The hardness of the cured film structure was measured by ASTM D-3363, expect that the "load" on the tester was increased to 1000 grams, rather than the standard 750 grams. The data reported in Table 3 is the hardest pencil that did not scratch the film structure.

Adhesion to Silver

A 400-angstrom thick layer of silver was sputter-deposited onto the microreplicated film. The adhesion of the silver to the cured composition was determined according to ASTM 3359, "Standard Methods for Measuring Adhesion by Tape Test". The adhesion properties were rated from one to five (with five the best).

TABLE 3

| Example | $T_g$, ° C., at 30 ft/min | Pencil hardness | Adhesion to Silver |
|---|---|---|---|
| 1 | 41–105 | 1H | 5-excellent adhesion; 0% metal removal |
| 2 | 41–95 | 1H | 5-excellent adhesion; 0% metal removal |
| Comp. | not measured | not measured | 4-good; 5% metal removal |

After application of the silver layer onto the microreplicated prismatic structure, the film was subjected to various heat and humidity conditions: 85° C. and ambient humidity for 240 hours; 65° C. and 95% relative humidity for 240 hours; and 200 cycles of −40° C. to 85° C. at 2 hours per cycle. There was no delamination between silver and the microreplicated base film of Examples 1 and 2, nor did the silver tarnish.

The present invention should not be considered limited to the particular examples described above, but rather should be understood to cover all aspects of the invention as set out in the attached claims. Various modifications, equivalent processes, as well as numerous structures to which the present invention may be applicable will be readily apparent to those of skill in the art upon review of the present specification. The claims are intended to cover such modifications and devices.

I claim:

1. A non-halogenated, polymerizable optical composition comprising bisphenol-A epoxy diacrylate; an alkyl styrene; and an acrylated epoxy having a functionality of two or greater.

2. The composition of claim 1, wherein the bisphenol-A epoxy diacrylate is present in the range of 40 to 90 weight percent of the total polymerizable composition.

3. The composition of claim 2, wherein the bisphenol-A epoxy diacrylate is present in the range of 55 to 80 weight percent of the total polymerizable composition.

4. The composition of claim 1, wherein the alkyl styrene is a C1 to C8 alkyl styrene.

5. The composition of claim 4, wherein the C1 to C8 alkyl styrene is present in the range of 5 to 25 weight percent of the total polymerizable composition.

6. The composition of claim 5, wherein the C1 to C8 alkyl styrene is methyl styrene.

7. The composition of claim 1, wherein the acrylated epoxy is present in the range of 1 to 15 weight percent of the total polymerizable composition.

8. The composition of claim 1, further comprising a photoinitiator.

9. The composition of claim 8, wherein the photoinitiator is present in the range of 0.25 to 10 weight percent of the total polymerizable composition.

10. The composition of claim 1, further comprising a surfactant.

11. The composition of claim 10, wherein the surfactant is a fluorocarbon and is present at a level of about 0.1 to 0.5 weight percent.

12. The composition of claim 1, wherein the composition comprises:
   the bisphenol-A epoxy diacrylate, present in the range of 65 to 80 weight percent of the total polymerizable composition;
   methyl styrene, present in the range of 15 to 20 weight percent of the total polymerizable composition;
   the acrylated epoxy is present in the range of 2 to 10 weight percent of the total polymerizable composition; and
   an ultraviolet light photoinitiator, present in the range of 1 to 5 weight percent of the total polymerizable composition.

13. The composition of claim 12, having an index of refraction of at least 1.57.

14. The polymerized product of the composition of claim 12.

15. The composition of claim 12, wherein the composition consists essentially of:
   about 75 to 80 weight percent bisphenol-A epoxy diacrylate;
   about 15 to 20 weight percent methyl styrene;
   about 3 to 5 weight percent of a tri-functional acrylated epoxy; and
   about 1.5 to 4.5 weight percent ultraviolet light photoinitiator; and
   less than one weight percent of a surfactant.

16. The polymerized product of the composition of claim 15.

17. A prismatic structure having a three-dimensional face, the structure comprising a polymerized structure of a polymerizable composition comprising bisphenol-A epoxy diacrylate; an alkyl styrene; and an acrylated epoxy having a functionality of two or greater.

18. The structure of claim 17, wherein the bisphenol-A epoxy diacrylate is present in the range of 40 to 90 weight percent of the total polymerizable composition.

19. The structure of claim 18, wherein the bisphenol-A epoxy diacrylate is present in the range of 55 to 80 weight percent of the total polymerizable composition.

20. The structure of claim 17, wherein the alkyl styrene is a C1 to C8 alkyl styrene.

21. The structure of claim 20, wherein the C1 to C8 alkyl styrene is present in the range of 5 to 25 weight percent of the total polymerizable composition.

22. The structure of claim 21, wherein the C1 to C8 alkyl styrene is methyl styrene.

23. The structure of claim 17, wherein the acrylated epoxy is present in the range of 1 to 15 weight percent of the total polymerizable composition.

24. The structure of claim 17, further comprising a photoinitiator present in the range of 0.25 to 10 weight percent of the total polymerizable composition.

25. The structure of claim 17, further comprising a surfactant.

26. The structure of claim 25, wherein the surfactant is a fluorocarbon and is present at a level of about 0.1 to 0.5 weight percent.

27. The structure of claim 17, wherein the three-dimensional prismatic structure is a microreplicated structure.

28. The structure of claim 27, wherein the microreplicated structure is a saw-tooth formation having a pitch of about 5 microns or more and about 200 microns or less.

29. The structure of claim 28, wherein the saw-tooth formations have a pitch of about 30 microns or more and about 80 microns or less.

30. The structure of claim 29, wherein the saw-tooth formations have a pitch of about 50 microns.

31. The structure of claim 28 wherein the saw-tooth formations include tilted surfaces at approximately 6 to 9 degrees.

32. A display apparatus comprising the structure of claim 17, and further comprising a metal layer on the three dimensional face, the metal layer comprising a material selected from a group consisting of silver, chromium, nickel, aluminum, titanium, aluminum-titanium alloy, gold, zirconium, platinum, palladium, aluminum-chromium alloy and rhodium.

33. The display apparatus of claim 32, the metal layer having a thickness greater than or equal to about 25 angstroms and less than or equal to about 3000 angstroms.

34. A structure comprising:
   (a) a polymerized structure of a polymerizable composition comprising:
      (i) bisphenol-A epoxy diacrylate;
      (ii) an alkyl styrene;
      (iii) an acrylated epoxy having a functionality of two or greater;
      (iv) a photoinitiator; and
   (b) a silver layer positioned on a surface of the polymerized structure.

35. The structure of claim 34, wherein the bisphenol-A epoxy diacrylate of the composition is present in the range of 55 to 80 weight percent of the total polymerizable composition.

36. The structure of claim 34, wherein the alkyl styrene of the composition is a C1 to C8 alkyl styrene.

37. The structure of claim 34, wherein the C1 to C8 alkyl styrene of the composition is present in the range of 5 to 25 weight percent of the total polymerizable composition.

38. The structure of claim 37, wherein the C1 to C8 alkyl styrene is methyl styrene.

39. The structure of claim 34, wherein the acrylated epoxy of the composition is present in the range of 1 to 15 weight percent of the total polymerizable composition.

40. The structure of claim 34, wherein the silver layer is vacuum deposited.

41. The structure of claim 34, wherein the silver layer has a thickness of about 100 to 500 angstroms.

* * * * *